US012245004B2

(12) United States Patent
Svajda et al.

(10) Patent No.: US 12,245,004 B2
(45) Date of Patent: Mar. 4, 2025

(54) EVENT ACTIVITY DETECTION SIGNALING

(71) Applicant: INVENSENSE, INC., San Jose, CA (US)

(72) Inventors: Miro Svajda, San Jose, CA (US); Stefano Riva, Merate (IT)

(73) Assignee: INVENSENSE, INC., San Jose, CA (US)

( * ) Notice: Subject to any disclaimer, the term of this patent is extended or adjusted under 35 U.S.C. 154(b) by 234 days.

(21) Appl. No.: 17/821,548

(22) Filed: Aug. 23, 2022

(65) Prior Publication Data

US 2024/0073598 A1 Feb. 29, 2024

(51) Int. Cl.

| | |
|---|---|
| ***H04R 3/00*** | (2006.01) |
| ***G10L 25/18*** | (2013.01) |
| ***G10L 25/51*** | (2013.01) |
| ***H04R 19/04*** | (2006.01) |

(52) U.S. Cl.

CPC ................ *H04R 3/00* (2013.01); *G10L 25/18* (2013.01); *G10L 25/51* (2013.01); *H04R 19/04* (2013.01); *H04R 2201/003* (2013.01)

(58) Field of Classification Search

None

See application file for complete search history.

(56) References Cited

U.S. PATENT DOCUMENTS

| | | | |
|---|---|---|---|
| 9,689,739 B2 | 6/2017 | Pan et al. | |
| 10,892,772 B2 | 1/2021 | Perrott | |
| 11,463,830 B2 | 10/2022 | Svajda | |
| 2015/0350772 A1 | 12/2015 | Oliaei et al. | |
| 2017/0164118 A1* | 6/2017 | Wiesbauer | H04R 1/04 |
| 2018/0114133 A1* | 4/2018 | Chowdhary | G06F 1/3287 |
| 2020/0162805 A1 | 5/2020 | Lesso | |
| 2020/0162823 A1 | 5/2020 | Fürst et al. | |
| 2021/0349843 A1* | 11/2021 | Giesselmann | G06F 9/30189 |

OTHER PUBLICATIONS

International Search Report and Written Opinion received for International PCT Application Serial No. PCT/US2023/028933 dated Oct. 31, 2023, 17 pages.

U.S. Appl. No. 17/396,105 "Acoustic Activity Detection" filed Aug. 6, 2021.

* cited by examiner

*Primary Examiner* — James K Mooney

(74) *Attorney, Agent, or Firm* — Amin, Turocy & Watson, LLP

(57) ABSTRACT

Acoustic and other activity detection signaling is provided herein. Operations of a method can include determining a micro-electromechanical system (MEMS) device is no longer in an initialization state and receiving a first signal that instructs the MEMS device to perform event activity detection. The method can also include receiving one or more event signals and determining that an event signal of one or more event signals satisfies a defined event characteristic. The method can also include outputting a second signal that comprises information indicative of a detection of event activity at the MEMS device being more than the defined event characteristic.

24 Claims, 7 Drawing Sheets

EVENT ACTIVITY DETECTION SIGNALING

TECHNICAL FIELD

This disclosure relates generally to the field of sensors, including sensor microphones, and more specifically, to a micro-electromechanical system that detects acoustic event activity and performs event activity detection signaling.

BACKGROUND

Activity detection, such as acoustic activity detection and/or other event activity detection requires the listening device (e.g., an acoustic sensor) to react to audio wake-up activity, which can require a large amount of power, a complex system, and a large amount of processing time to analyze and quantify the audio content. For example, the acoustic sensor might only wake up a processing system based on an on/off indication that a sound pressure event has exceeded a defined level. The processing system must be fully powered up and a set of audio data is collected, processed, and further processing performed in order to analyze and quantify the audio content. Accordingly, unique challenges exist to provide an acoustic sensor that can detect and process audio wake-up activity quicker, with less power, and with less complexity.

SUMMARY

The subject application relates to acoustic activity detection signaling circuits and/or other types of event activity detection signaling circuits for a single microphone sensor and/or multiple microphone sensors, as well as other types of sensors. The subject application also relates to acoustic activity detection methods and/or other types of event activity detection methods for the single microphone sensor and/or multiple microphone sensors, as well as other types of sensors.

Provided herein is a device that includes a micro-electromechanical system (MEMS) transducer and circuitry for activity detection. The circuitry can include a first node configured to transmit or receive data associated with a clock signal. The circuitry can also include a second node configured to operate in a first modality during a power-up stage of the device and in a second modality after completion of the power-up stage of the device. The second node is configured to receive a signal that causes the device to perform the activity detection based on an activity determination.

In an example, the clock signal is lower than a normal operating frequency or has stopped at the first node. In another example, the circuitry can include, according to some implementations, a third node configured to transmit one or more acoustic signals.

In some implementations, the second node is configured to receive a signal that causes the device to perform the acoustic activity detection. For example, the second node can perform the acoustic activity detection based on a determination, at the first node, that the clock signal has stopped or operate to a frequency below normal operation.

According to some implementations, while operating in the second modality, the second node is configured as a communication interface for the activity detection. Further to these implementations, the communication interface comprises at least one of transmit signals or receive signals associated with the acoustic activity detection. In some implementations, the communication interface is, or operates as, a single wire communication interface. The communication interface can facilitate write access and read access to internal registers associated with the MEMS transducer. It is understood to those skilled in the art, writing to internal registers may include altering a functional mode of operation. According to some implementations, the communication interface is a serial interface.

In an example, the MEMS transducer comprises a MEMS acoustic sensor that receives an acoustic signal comprising an acoustic signal frequency. According to another example, the second node is a MEMS transducer selector pin. The device can include, according to some implementations, a serial interface that communicates with an external device. Further, according to some implementations, a voltage at the second node indicates a location of the device in a system of devices.

According to some implementations, the activity detection is based on an acoustic activity. The acoustic activity can include at least one of speech, keyword, crash, explosion, gunfire, shattered glass, an unsafe acoustical level, a built-in self-test failure, an over-temperature threshold, and an under-temperature threshold.

In accordance with some implementations, the signal is a first receive signal. Further to these implementations, the device further comprises a light sensor. Additionally, while operating in the second modality, the second node is configured to transmit a transmit signal when a second signal, from the light sensor, exceeds a threshold.

In some implementations, the signal is a first receive signal and the device further comprises a humidity sensor. Further to these implementations, while operating in the second modality, the second node is configured to transmit a transmit signal when a second signal, from the humidity sensor, exceeds a threshold.

Also provided is a method that includes determining a micro-electromechanical system (MEMS) device is no longer in an initialization state. The method also includes receiving a first signal that instructs the MEMS device to perform acoustic activity detection and receiving one or more acoustic signals. Further, the method includes determining that an acoustic signal of one or more acoustic signals satisfies a defined acoustic characteristic. The method can also include outputting a second signal that comprises information indicative of a detection of acoustic activity at the MEMS device being more than the defined acoustic characteristic. In an example, the defined acoustic characteristic can include a frequency spectrum signal level or power of the signal in a given frequency spectrum.

According to some implementations, the method can include determining the MEMS device is in a power up state and receiving a selection after determining the initialization state. In accordance with some implementations, the method can include communicating with an external device via a communication interface. The communication interface can be a serial interface.

Receiving the first signal can include, according to some implementations, receiving the first signal at a selector node. Outputting the second signal can include, according to some implementations, outputting the second signal at a selector node.

The method can also include stopping an external clock or lowering a frequency after receiving the first signal. Alternatively, or additionally, the method can include receiving defined acoustic characteristics during an initializing state.

According to some implementations, the acoustic signal is a first acoustic signal and the method can include, after a delay before receiving a clock signal, determining for a second time that a second acoustic signal of one or more acoustic signals satisfies the defined acoustic characteristic. Further to these implementations, the method can include, after the determining for the second time, changing the defined acoustic characteristic.

Further, in accordance with some implementations, the method can include receiving a clock start signal or clock at normal operating frequency. The acoustic activity detection can be discontinued upon or after the clock start signal is received.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments.

Acoustic sensing is used to access an environment for an event of interest (e.g., human voice, activation of a smoke detector, glass breaking, gun shot, or another acoustical event). For example, acoustic sensing can be utilized for security purposes or other purposes for which it is desirable to monitor an environment for one or more events of interest. In most implementations, acoustic events that are of interest occur infrequently. Thus, existing systems employ an always-on (e.g., always listening) acoustic wakeup detector for detection of one-time events (e.g., glass breaking) and/or for detection of events that are of critical importance. Further, existing systems, for which it is necessary to react to audio wake-up activity, require a large (sometimes significant) amount of power, are complex, and require time to analyze and quantify the audio content.

Existing acoustic activity detection systems or circuits can include a microphone having an embedded acoustic activity detect circuit and a voice processor, which can include embedded Digital Signal Processing (DSP) functionality. The operations of such systems allow only for wake up of a system based on an "on" indication and/or an "off" indication that a sound pressure event has exceeded a specified decibel Sound Pressure Level (dB SPL). Once this indication has occurred, the system is fully powered up and a set of audio data is collected and processed to extract frequency and amplitude details. This data must then be analyzed to determine next steps. For example, the data is processed by a voice processor or other type of acoustic analyzer and a Fast Fourier Transform (FFT), for example, is executed on the content, which also goes through a series of algorithms to classify what event has occurred. Such data processing can consume power and time.

The one or more embodiments provided herein can facilitate a low power acoustic (and/or other event) activity detection signaling circuit with a single output configured as a one wire communication interface. Also provided is a low acoustic (and/or other event) activity detection signaling method that utilizes an output as a one wire communication interface.

Figure 1:
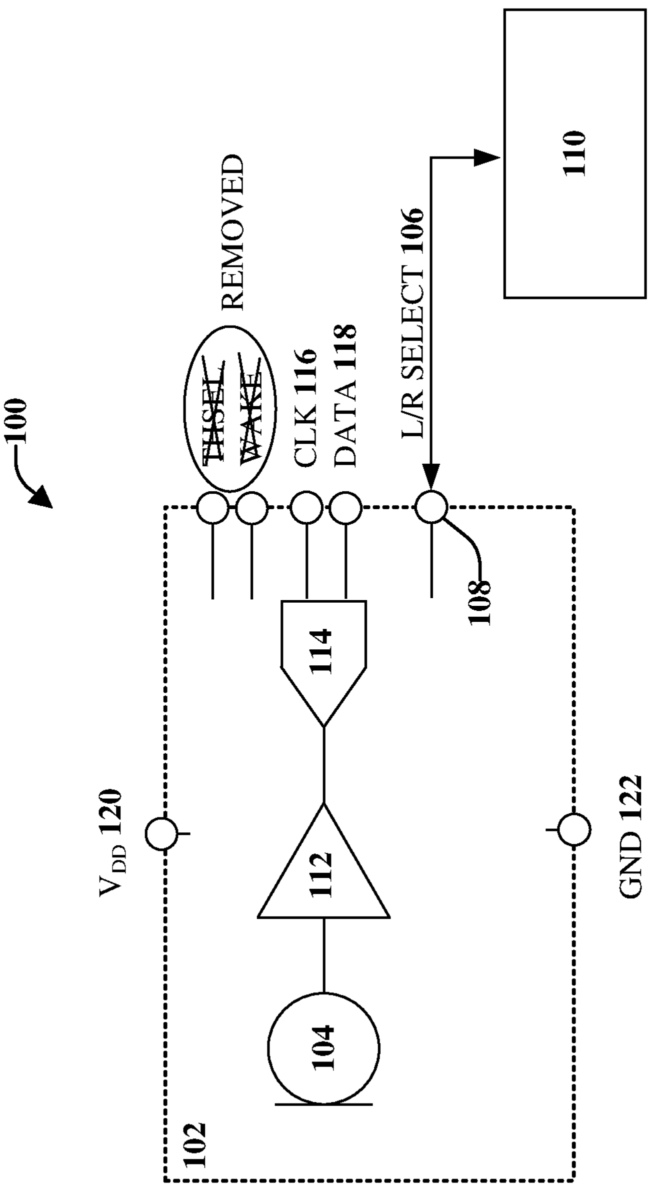
FIG. 1 illustrates an example, non-limiting, device in accordance with one or more embodiments described herein.

With reference initially to FIG. 1, illustrated is an example, non-limiting, device 100 in accordance with one or more embodiments described herein. According to some implementations, the device can be a digital micro-electro-mechanical system (MEMS) device, a MEMS microphone, or another type of sensor device. Various embodiments discussed herein relate to acoustic activity detection. As provided herein, acoustic activity detection is an ultra-low power edge processing feature in which a microphone (e.g., a MEMS microphone) monitors an environment for acoustic activity (e.g., an event of interest) and wakes up a System on Chip (SoC) or an application processor when acoustic activity is detected.

It is noted that acoustic signal detection is only one type of event that could be detected. Instead, other events can also be detected while sharing similar detection configuration and signaling processes as discussed herein. These other events include, but are not limited to, smart acoustic events, such as Voice Activity Detection (VAD), Keyword Spotting (KWS), Automatic Speech Recognition (ASR), and so on. For example, the smart acoustic events can include, but are not limited to: speech, keyword, crash, explosion, gunfire, shattered glass, and so on.

Other events that can be detected are unsafe acoustical levels. For example, levels over a defined dB SPL level (e.g., more than 130 dB SPL) can be considered unsafe and monitored as discussed herein.

Yet another event can be Built-In Self-Test (BIST) failures. For example, an internal self-test can be utilized to determine various conditions including microphone health and/or condition as well as the health and/or condition of other components.

Still other events can relate to temperature conditions. For example, an over temperature threshold and/or an under temperature threshold can trigger another event detection. Such detection can be performed by an internal temperature sensor, for example.

In another example, humidity and/or moisture can trigger another event. The humidity and/or moisture can be detected by an internal humidity sensor, for example. Further, another event can be pressure, which can be monitored by an internal pressure sensor, for example. Ambient light conditions can be another trigger event, which can be evaluated by an internal light sensor.

Generally, when an event is detected, the detection of the event is signaled to an external host processor or a SoC that will process details associated with the event and/or receive instruction based on the detection of the event. In order to detect an event, the microphone should be at the lowest possible power level since the microphone needs to be "always on" in order to detect the event. In some cases, as many circuits and components as possible can be powered down or disabled in the microphone function and only (or almost only) the activity detection is enabled active. Upon or after the detection, the occurrence of the detection needs to be communicated. Accordingly, provided herein is a signaling method for performing the communication to the external host processor, SoC, and/or another receiving component.

With continuing reference to FIG. 1, the device 100 can include a MEMS transducer and circuitry for activity detection. A sensor 102 can include a digital MEMS transducer 104 and circuitry for processing one or more acoustic signals.

The device 100 can be coupled to a signal line 106 via a selector node 108. The selector node 108 can also be referred to as a selector output, a left/right (L/R) input, a MEMS transducer selector, and so on. In some implementations, the selector node 108 can be a pin. The selector node 108 can be utilized for communication of one or more MEMS sensors of in a system with a plurality of MEMS sensors (e.g., a package comprising the digital MEMS acoustic sensor 102), for example, with a controller 110. According to some implementations, the controller 110 can be an external controller. However, in some implementations, a chip or SoC can comprise both the controller 110 and the digital MEMS acoustic sensor 102.

The device 100 can include an analog-to-digital converter (ADC) 112 coupled to a pulse density modulation (PDM) modulator 114. The PDM modulator 114 receives an external clock (CLK 116) signal and provides a digital data (DATA 118) output signal of the device 100.

The device 100 can also include a channel select component (not shown) coupled to a control interface component (not shown) at a control pin comprising the selector node 108 (e.g., a L/R select pin of the device 100). In some implementations, the device 100 can include a power management component (not shown) coupled to a $V_{DD}$ 120 node or pin and a GND 122 node or pin.

In further detail, the device 100 might be limited to defined inputs/outputs (e.g., defined pins) that are needed for operation. Such inputs/outputs include power to the output interface for an audio stream to transmit out the data. Included on the digital MEMS sensor is also a Left and Right (L/R) pin, referred to herein as a selector node or selector input/output, which can be utilized to select the left or right microphone in a system of two microphones.

Generally, the selector output (L/R pin) is used for communication during a testing process. In some cases, end users can be given access to perform configuration utilizing the selector output. As discussed herein, the selector input, which was previously limited to the function of the initial setup, is utilized as a multiple function interface to also signal the acoustic activity detection event. By utilizing the existing selector input, a standard interface for the digital MEMS sensor can be utilized, which can provide efficiencies in terms of deployment and implementation.

It is noted that in the embodiment of FIG. 1, a THSEL pin and a WAKE pin are not included in the device 100. For example, the THSEL pin and WAKE pin, which are included on other digital MEMS sensors, has been removed as indicated. Alternatively, during fabrication, the THSEL pin and WAKE pin are not included on the device (e.g., are not needed). By removing (or not including) the THSEL pin and WAKE pin, the device 100 is a five input/output (e.g., pin) configuration. This configuration includes the selector node 108, the CLK 116 output, the DATA 118 output, the $V_{DD}$ 120 node, and the GND 122 node.

As provided herein, the selector node 108 is utilized to implement the functions that were previously implemented by the THSEL and WAKE pins such that the selector node 108 will be shared for the first two functions that were previously for the polarity detection. It is noted that the polarity detection is active only during power up. Thus, according to an implementation, on the first initial power up when the chip starts, the selector node 108 reads the configuration of the internal registers and the status of the left and right status is read. Upon or after the first initial power up, the left and right statuses are retained and the selector node 108 has no other function for the remainder of the operation. Accordingly, the selector node 108 can be used as a communication interface for the event activity detection as discussed herein.

In accordance with an implementation, the acoustic activity detection and/or other event activity detection configuration is facilitated using the selector node 108 as the communication interface. Also, the acoustic activity detection and/or other event activity detection is configured and started with an activity detection start command using the selector node 108. Thus, the selector node 108 is utilized as the input/output during acoustic activity mode and/or other event activity mode. When an event is detected, the output signal notification of the event is transmitted to other components via the selector node 108.

Figure 2:
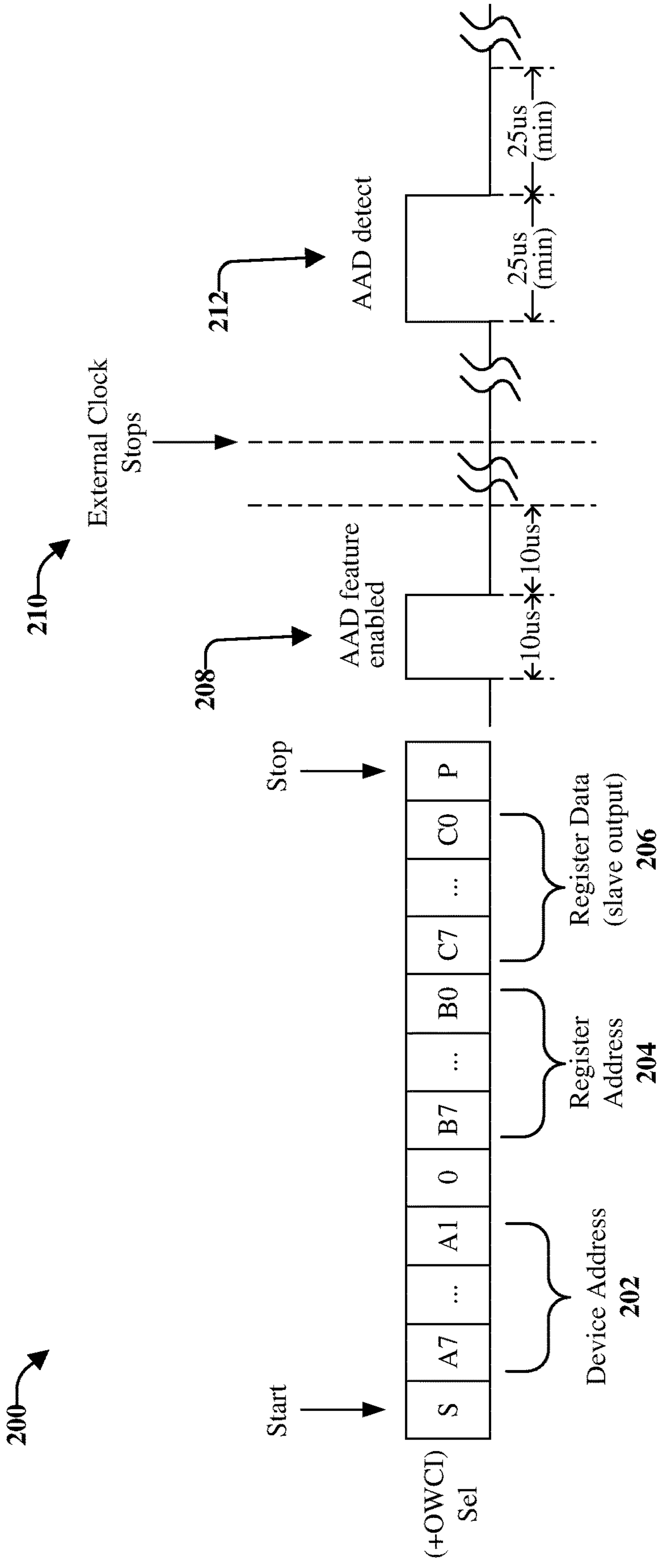
FIG. 2 illustrates an example, non-limiting, protocol for read and write operations in accordance with one or more embodiments described herein.

FIG. 2 illustrates an example, non-limiting, protocol for read and write operations in accordance with one or more embodiments described herein. Repetitive description of like elements employed in other embodiments described herein is omitted for sake of brevity.

Illustrated in FIG. 2 is a single write operation 200 comprising a device address 202, a register address 204, and register data 206, without the implementation or necessity of a signal to acknowledge (ACK) the receipt of data. In this embodiment, "S" indicates a "start" bit and "P" indicates a stop bit. According to an implementation, the "start" bit and/or the "stop" bit can be generated by an external controller as defined by predefined control symbols, for example. The device address 202 could be set as a default (e.g., 7'h28) and/or could be changeable to accommodate any of a variety in number and/or type of MEMS sensor. It is noted that the "stop" control symbol could occur at any place during the protocol. Thus, whenever a "stop" control symbol is detected or determined, the MEMS sensor could revert to a reset state to await a new "start" control system.

In this example, there is a single pin (e.g., the selector node 108) utilized for the communication of the event detection trigger. The selector output is configured as an OWCI configuration. OWCI is a one wire communication interface that is bidirectional. The OWCI is a serial link that enables the device or sensor to perform the communication over one wire (e.g., one node, one pin). If data is to be written into a register in the microphone, the OWCI can be utilized to perform the write operation. Thus, the host processor can send communication to the MEMS sensor to perform initial setups or perform calibration. The writing into the register is what is referred to as the one wire communication. The OWCI process is when the host processor is writing into the microphone register through that single node. Thus, the OWCI is the read/write access to the internal registers.

Upon or after receipt of an indication or command to begin the event detection (e.g., received as an input over the OWCI), the activity event detection (e.g., the AAD feature) is enabled 208. The detection mode starts upon or after the external clock is stopped, as indicated at 210 (e.g., via the CLK 116 output). Upon or after the external clock is stopped or the clock frequency is lower than the normal operating frequency, acoustic activity detection is enabled and, thereafter, detection can occur, as indicated at 212. Based on the detection of a defined event, output data indicative of the occurrence of the detected event is transmitted via the selector node 108. Upon or after receiving a clock start signal or clock frequency has resumed to normal operating frequency, the event detection can be stopped or discontinued.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 3:
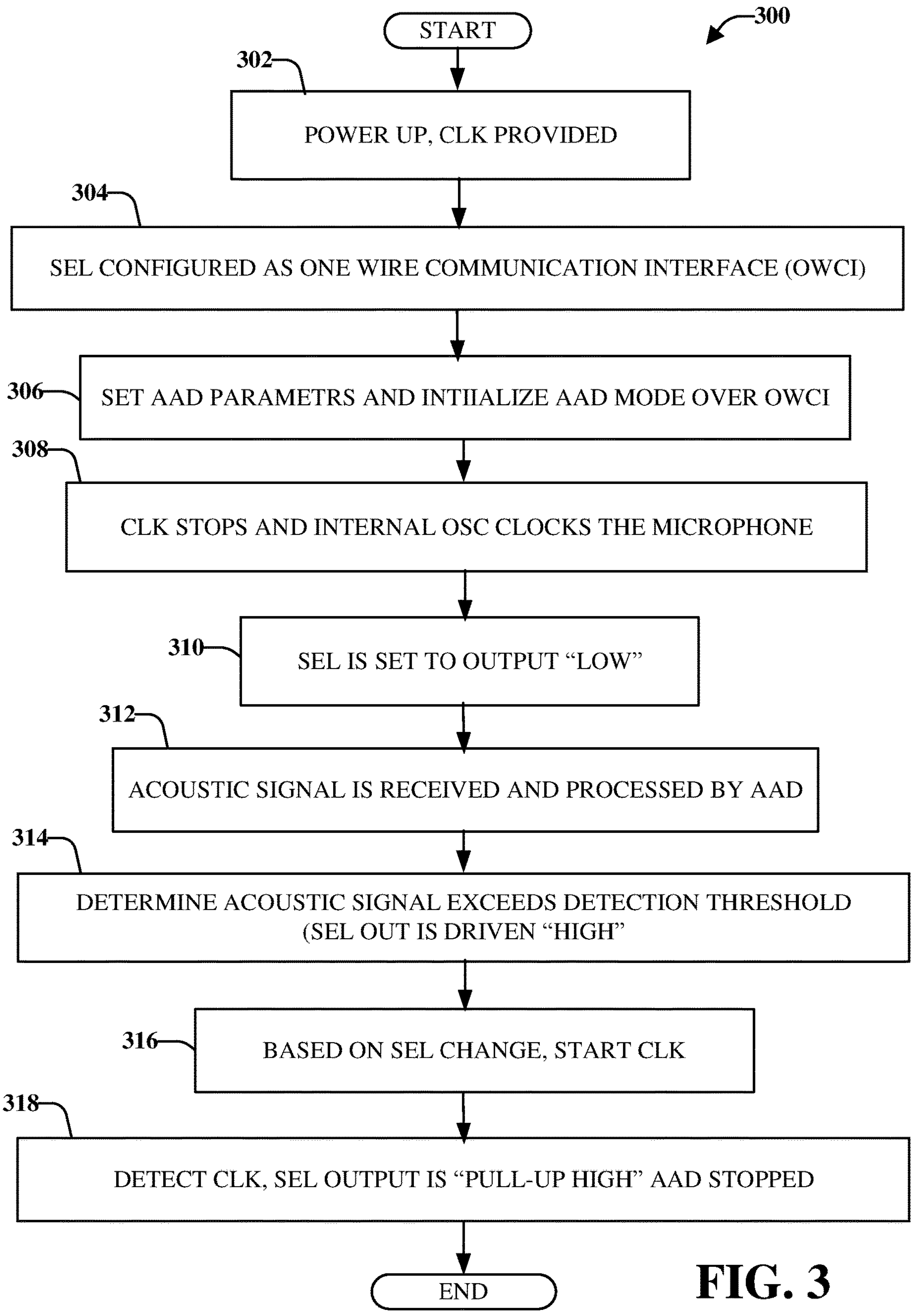
FIG. 3 illustrates a flow diagram of an example, non-limiting, computer-implemented method for acoustic activity detection signaling using a shared selector node in accordance with one or more embodiments described herein.

FIG. 3 illustrates a flow diagram of an example, non-limiting, computer-implemented method 300 for acoustic activity detection signaling using a shared selector node in accordance with one or more embodiments described herein. The computer-implemented method 300 can be implemented by a circuit (e.g., the device 100, a MEMS microphone, a system including a processor, a temperature sensor, a humidity sensor, a pressure sensor, a light sensor and so on).

The computer-implemented method 300 starts with initialization of the sensor. To initialize the sensor, at 302 of the computer-implemented method 300 the sensor is powered up and the CLK input is provided (e.g., received at the digital MEMS microphone, a device, or other sensor). For example, a one-time, programmable (OTP) memory is read and the microphone (MIC) is configured. The power up of the sensor and the CLK input can be provided during an IDLE mode.

At 304, the selector output (e.g., the selector node 108) is configured as a one wire communication interface (OWCI). Thus, during an initial power-up, the selector node can read the configuration of the internal registers and read the status of the selector node (e.g., the L/R pin), such as for polarity detection. After the polarity detection (e.g., after the initial power up), the polarity status is retained and the selector output can be utilized for other functions, as discussed herein (e.g., as an OWCI).

At 306, the host processor sets the AAD parameters. For example, the AAD parameters can be received at the digital MEMS sensor. Further, the AAD mode can be initialized over the OWCI. At 308, the CLK stops and the internal oscillator (OSC) clocks the MIC. The SEL is set to output "low," at 310. At this point (e.g., upon or after the clock is stopped) the activity detection is activated.

An acoustic signal is received, at 312, and processed by the AAD. Based upon the AAD determining that the acoustic signal satisfies a detection threshold (e.g., exceeds the detection threshold), the SEL output is driven "high," at 314, for at least a minimum period of time. For example, the various "thresholds" discussed herein can be defined as a simple amplitude value, a moving average value, or a moving Root Mean Square (RMS) value. Alternatively, if the AAD determines the acoustic signal does not satisfy the detection threshold, the digital MEMS sensor disregards the signal and continues to monitor the environment.

At 316, when the host processor detects the SEL change, the CLK is started. Upon or after the CLK signal is detected, at 318, the SEL output is "pull-up high" and the AAD mode is stopped. Further, the MIC mode is set by CLK frequency and the SEL is configured as the OWCI. At this point the MIC is ready to receive host processor instructions.

Figure 4:
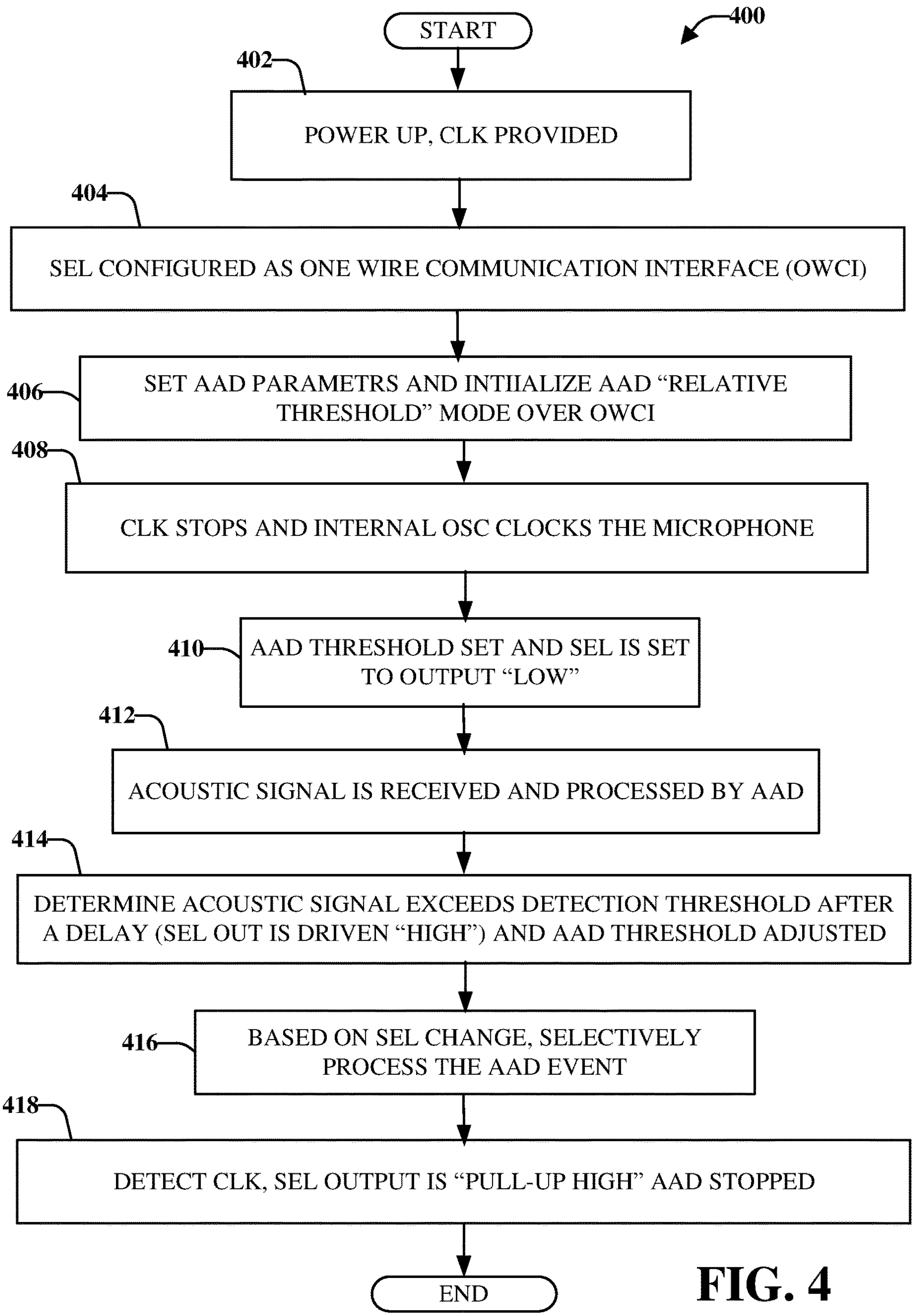
FIG. 4 illustrates a flow diagram of an example, non-limiting, computer-implemented method for acoustic activity detection signaling using a shared selector output and a relative threshold in accordance with one or more embodiments described herein.

FIG. 4 illustrates a flow diagram of an example, non-limiting, computer-implemented method 400 for acoustic activity detection signaling using a shared selector output and a relative threshold in accordance with one or more embodiments described herein. The computer-implemented method 400 is configured to operate without a host processor (as compared to the computer-implemented method 300 of FIG. 3).

The computer-implemented method 400 starts with initialization of the sensor. To initialize the sensor, at 402 of the computer-implemented method 400 the sensor is powered up and the CLK input is provided (e.g., received at the digital MEMS sensor). For example, a one-time, programmable (OTP) memory is read, and the microphone (MIC) is configured. Powering up of the sensor and providing the CLK input can be performed during an IDLE mode.

At 404, the selector output (e.g., the selector node 108) is configured as a one wire communication interface (OWCI). Thus, during an initial power-up, the selector node can read the configuration of the internal registers and read the status of the selector node (e.g., the L/R pin), such as for polarity detection. After the polarity detection (e.g., after the initial power up), the polarity status is retained and the selector node can be utilized for other functions, as discussed herein (e.g., as an OWCI).

At 406, the host processor sets the AAD parameters. For example, the AAD parameters can be received at the digital MEMS sensor. Further, the AAD mode can be initialized in a "relative threshold mode" over the OWCI. At 408, the CLK stops or receives lower than the normal operating frequency and the internal oscillator (OSC) clocks the MIC. At 410, the AAD threshold is set based on one or more AAD parameters. Further, the SEL is set to output "low."

An acoustic signal is received, at 412, and processed by the AAD. At 414, a determination is made whether the acoustic signal exceeds a detection threshold. The determination can be made after a delay, for example. Further, the SEL out is driven "high." Based on a determination that the acoustic signal satisfies the detection threshold (e.g., meets or exceeds the detection threshold), the AAD threshold is increased by a defined increase amount. Alternatively, if the determination is that the acoustic signal fails to satisfy the detection threshold (e.g., is less that the detection threshold), the AAD threshold is decreased by a defined decrease amount. According to some implementations, the defined increase amount and the defined decrease amounts are different values, are the same values, or a combination thereof. Further, the defined increase amount and/or the defined decrease amount can be configurable.

The new value for the AAD threshold is stored in an internal register. Further, the AAD threshold delay can be set by the OTP, the OWCI register, or as a function of an AAD threshold.

At 416, when the host processor detects the SEL change, the host processor can determine whether or not to process the event. Further, upon or after the CLK signal is detected, at 418, the SEL output is "pulled-up high" and the AAD mode is stopped. The MIC mode is set by CLK frequency and the SEL is configured as an OWCI. At this point the MIC is ready to receive host processor instructions.

Figure 5:
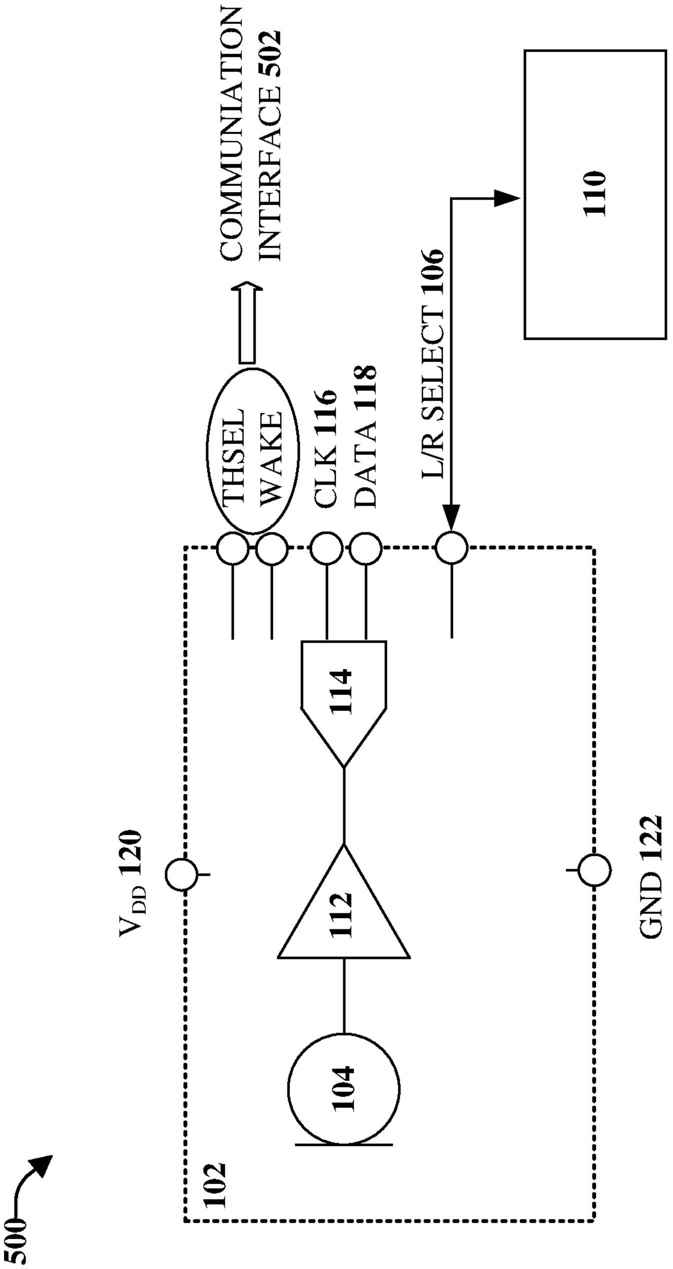
FIG. 5 illustrates another example, non-limiting, device in accordance with one or more embodiments described herein.

FIG. 5 illustrates another example, non-limiting, device 500 in accordance with one or more embodiments described herein. Repetitive description of like elements employed in other embodiments described herein is omitted for sake of brevity.

The device 500 is similar to device 100 of FIG. 1. However, in the configuration of the device 500 the THSEL pin and WAKE pin are replaced with a communication interface 502. For example, the communication interface 502 can be an I2C interface, an I3C interface, a serial peripheral interface (SPI), and so on.

The communication interface 502 can be utilized to configure the microphone and/or the AAD function. In another example, the communication interface 520 can be utilized to configure another type of sensor and/or another type of event detection function.

The selector node 108 can be shared for the functions. For example, as discussed, the selector node 108 (e.g., L/R pin) can be utilized for polarity detection during power-up. After power-up the selector node 108 can be shared for the event detection functions. For example, the selector node 108 can be configured as an OWCI during production test and factory debug. Further, the selector node 108, configured as the OWCI communication, can facilitate an output (e.g., "WAKE") based on an event detection event and facilitate signaling to the host processor in the event detection mode.

In a specific example, the device 500 can measure a light signal via a light sensor in the microphone package and determine whether the light signal exceeds a threshold light signal threshold. Upon or after a determination that the light signal exceeds the threshold light signal threshold, a signal is sent via the communication interface 502 (e.g., an I2C interface) to the host processor. For example, the "threshold" can be defined as a simple amplitude value, a moving average value, or a moving RMS value. Further details related to the light signal implementation can be found in U.S. patent application Ser. No. 17/174,890, filed Feb. 12, 2021, and entitled "DISCRIMINATION OF LIGHT INTERFERENCE IN A MEMS MICROPHONE," the entirety of which is expressly incorporated by reference herein.

Figure 6:
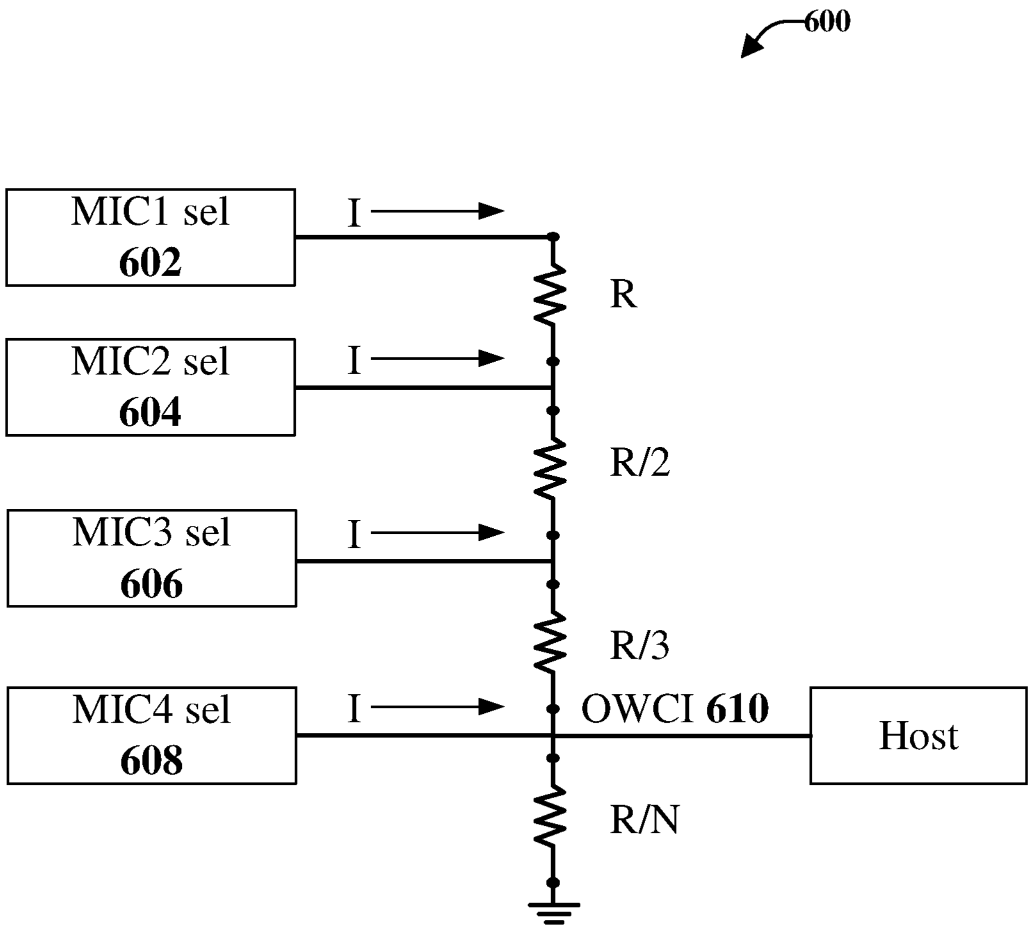
FIG. 6 illustrates an example, non-limiting, micro-electromechanical system sensor circuit for device identification detection for two or more sensors over a one wire communication interface in accordance with one or more embodiments described herein.

FIG. 6 illustrates an example, non-limiting, MEMS sensor circuit 600 for device identification detection for two or more sensors over a one wire communication interface in accordance with one or more embodiments described herein.

As illustrated, the MEMS sensor circuit 600 comprises two or more microphones that have respective selector (sel) inputs/outputs (e.g., SEL pin), which are illustrated as a first microphone selector (MIC1 sel 602), a second microphone selector (MIC2 sel 604), a third microphone selector (MIC3 sel 606), and a fourth microphone selector (MIC4 sel 608). During initialization, each microphone can source current (I) to the SEL pin after power up and the OTP reads for a defined amount of time. After a defined delay, voltage at the SEL input is measured while Io is still provided.

The voltage measurement is digitized by current times resistor (I*R) increments. Each I*R measurement unit directly provides the microphone identifier or ID number. The SEL pin is configured to the OWCI 610 after a defined delay. The Io current and MIC ID detection is disabled (e.g., turned off) after completion.

Thus, more than one microphone or other sensor can share a same communication bus, while each sensor is individually identifiable. For example, the size of the respective resistors (e.g., R, R/2, R/3, R/N) are utilized in order for the respective microphone (e.g., MIC1 sel 602, MIC2 sel 604, MIC3 sel 606, MIC4 sel 608) to obtain internal identification numbers. The internal identification numbers are utilized by the microphones to communicate with the host processor.

In an example, the respective resistors can be weighted according to a procedure that allows each microphone (during power up) to be programmed to source the fixed amount of current out of the pin (e.g., the selector node 108). The different size or weighted resistors increases different voltages on each microphone pin, which is converted by an internal analog to digital converter to a unique identification number. Upon or after all microphones have completed power up and configuration, the respective identification number are assigned, allowing the host processor to communicate individually with each microphone. In this implementation, the selector node 108, during power up, is performing identification instead of polarity detection.

Figure 7:
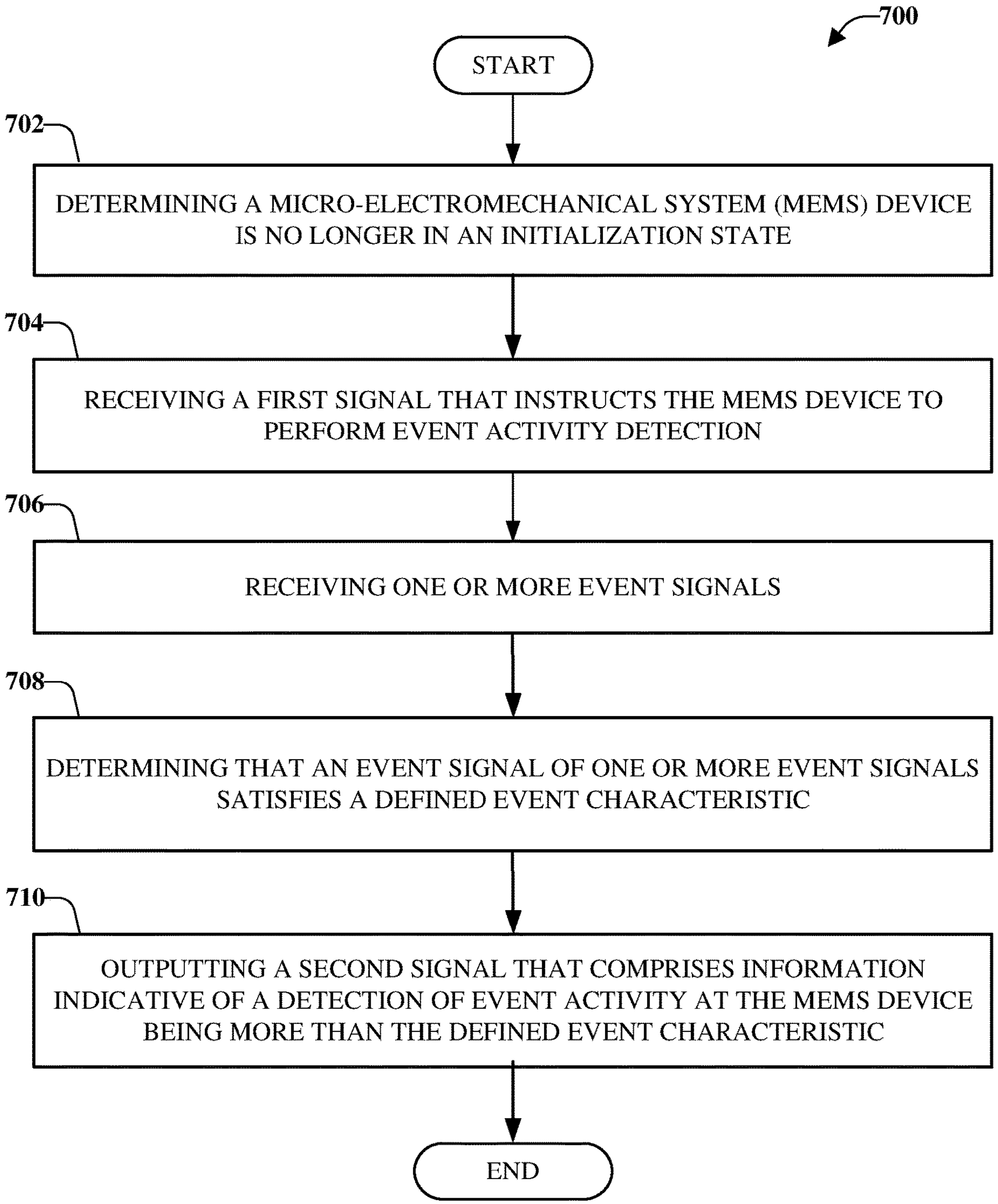
FIG. 7 illustrates a flow diagram of an example, non-limiting, computer-implemented method for event activity detection signaling using a shared selector output and a relative threshold in accordance with one or more embodiments described herein.

FIG. 7 illustrates a flow diagram of an example, non-limiting, computer-implemented method 700 for event activity detection signaling using a shared selector output and a relative threshold in accordance with one or more embodiments described herein.

The computer-implemented method 700 starts, at 702, with a determination that a micro-electromechanical system (MEMS) device is no longer in an initialization state. Upon or after the device is no longer in the initialization state, a selector node can be utilized as a one wire communication interface as discussed herein.

At 704, a first signal that instructs the MEMS device to perform event activity detection can be received. According to an implementation, the first signal can be received at a selector node. In some implementations, an external clock is stopped after the first signal is received. In other implementation, the clock frequency is lower than the normal operating frequency after the first signal is received. Upon or after receipt of the first signal, the MEMS device enters a detection state in order to detect a defined event. For example, the defined event can be acoustic detection, smart acoustic event detection, unsafe acoustic level detection, BIST failure detection, temperature detection, humidity detection, moisture detection, pressure detection, light detection, and so on.

One or more signals related to the event being detected are received, at 706. The one or more signals are analyzed and, at 708, it can be determined that an event signal of the one or more signals related to the event satisfies a defined event characteristic. The defined event characteristic can be received during an initializing state.

For example, for light detection, the defined event characteristic can be an amount of light is above (or below) a defined threshold light level, a duration of a light received that is longer (or shorter) than a defined light duration, and so on. In another example, for humidity and/or moisture detection, the defined event characteristic can be that an amount of humidity or moisture detected is more than (or less than) a defined humidity or moisture threshold. For pressure detection, the defined event characteristics can be a threshold amount of pressure, or a duration of the defined pressure amount. For temperature detection, the defined event characteristics can be a defined temperature and a detected temperature above (or under) the defined temperature, which trigger the event.

Based upon the determination at 708, a second signal that comprises information indicative of a detection of event activity at the MEMS device being more than the defined event characteristic is output at 710. In an example for the event activity detection, the defined event characteristic can be a frequency spectrum signal level. Outputting the second signal can include outputting the second signal at the selector node.

In some implementations, the computer-implemented method 700 can include determining the MEMS device is in a power up state and receiving a selection after determining the initialization state. Alternatively, or additionally, the computer-implemented method 700 can include communicating with an external device via a communication interface. In an example, the communication interface can be a serial interface.

In some implementations, the computer-implemented method 700 can include, after a delay before receiving a clock signal, determining for a second time that the event signal of the one or more event signals satisfies the defined event characteristic. Further to these implementations, after the determining for the second time, the computer-implemented method can include changing the defined event characteristic.

Further, the computer-implemented method 700 can include receiving a clock start signal. Based on receipt of the clock start signal, the event activity detection can be discontinued.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device comprising:

a micro-electromechanical system (MEMS) microphone comprising:
- a MEMS transducer; and
- circuitry for activity detection, wherein the circuitry comprises:
  - a first node configured to transmit or receive data associated with a clock signal; and
  - a second node configured to operate in a first modality during a power-up stage of the device and in a second modality after completion of the power-up stage of the device, wherein the second node is configured to receive a signal that causes the device to perform the activity detection based on an activity determination.

2. The device of claim 1, wherein the clock signal is lower than a normal operating frequency or has stopped at the first node.

3. The device of claim 1, wherein the circuitry further comprises a third node configured to transmit one or more acoustic signals.

4. The device of claim 1, wherein, while operating in the second modality, the second node is configured as a communication interface for the activity detection.

5. The device of claim 4, wherein the communication interface is configured to transmit signals or receive signals associated with the activity detection.

6. The device of claim 4, wherein the communication interface facilitates write access and read access to internal registers associated with the MEMS transducer.

7. The device of claim 4, wherein the communication interface is a serial interface.

8. The device of claim 1, wherein the MEMS transducer comprises a MEMS acoustic sensor that receives an acoustic signal comprising an acoustic signal frequency.

9. The device of claim 1, wherein the second node is a MEMS transducer selector pin.

10. The device of claim 1, the MEMS microphone further comprises a serial interface that communicates with an external device.

11. The device of claim 1, wherein the activity detection is based on an acoustic activity that comprises one of: speech, keyword, crash, explosion, gunfire, shattered glass, and an unsafe acoustical level.

12. The device of claim 1, wherein the signal is a first receive signal, and wherein the device further comprises a light sensor and, while operating in the second modality, the second node is configured to transmit a transmit signal when a second signal, from the light sensor, exceeds a threshold.

13. The device of claim 1, wherein the signal is a first receive signal, and wherein the device further comprises a humidity sensor and, while operating in the second modality, the second node is configured to transmit a transmit signal when a second signal, from the humidity sensor, exceeds a threshold.

14. The device of claim 1, a voltage at the second node indicates a location of the device in a system of devices.

15. A method, comprising:

determining a micro-electromechanical system (MEMS) device is no longer in an initialization state;

receiving, by a MEMS microphone of the MEMS device, a first signal that instructs the MEMS device to perform acoustic activity detection;

receiving, by the MEMS microphone, one or more acoustic signals;

determining, by the MEMS microphone, that an acoustic signal of one or more acoustic signals satisfies a defined acoustic characteristic; and outputting, by the MEMS microphone, a second signal that comprises information indicative of a detection of acoustic activity at the MEMS device being more than the defined acoustic characteristic.

16. The method of claim 15, further comprising:

prior to the receiving the first signal and after the determining the MEMS device is no longer in the initialization state, utilizing, by the MEMS microphone, a selector node as a one wire communication interface.

17. The method of claim 15, wherein the defined acoustic characteristic comprises a frequency spectrum signal level.

18. The method of claim 15, wherein the receiving the first signal comprises receiving the first signal at a selector node of the MEMS microphone.

19. The method of claim 15, wherein the outputting the second signal comprises outputting the second signal at a selector node of the MEMS microphone.

20. The method of claim 15, further comprising:

stopping an external clock or lowering a frequency after receiving the first signal.

21. The method of claim 15, further comprising:

receiving the defined acoustic characteristic during an initializing state.

22. The method of claim 15, wherein the acoustic signal is a first acoustic signal, and wherein the method further comprises:

after a delay and before receiving a clock signal, determining for a second time that a second acoustic signal of one or more acoustic signals satisfies the defined acoustic characteristic.

23. The method of claim 22, further comprising:

after the determining for the second time, changing the defined acoustic characteristic.

24. The method of claim 15, further comprising:

receiving a clock start signal or clock at normal operating frequency; and discontinuing the acoustic activity detection.

* * * * *